United States Patent Office 3,345,287
Patented Oct. 3, 1967

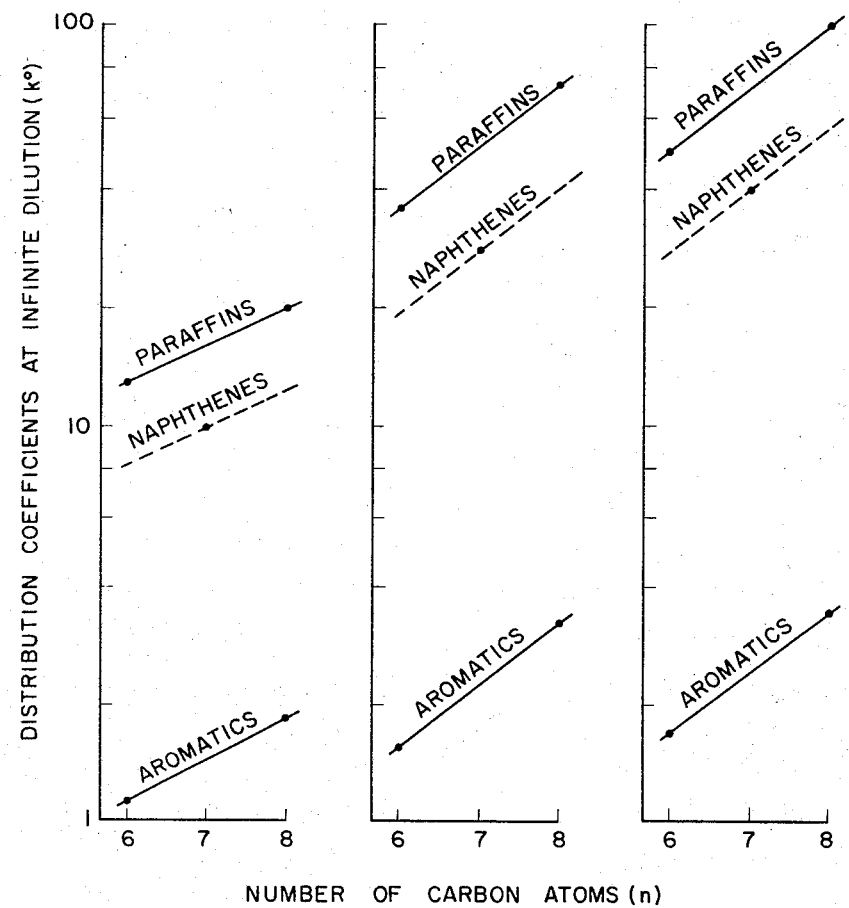

3,345,287
SOLVENT EXTRACTION OF AROMATICS
Heinz Voetter, Amsterdam, Netherlands, Klaus Hunger, Wood River, Ill., Ulrich Hasserodt, Menden, Germany, Eduard Sweep, Amsterdam, Netherlands, and Friedrich W. A. G. K. Korte, Hangelar, Germany, assignors to Shell Oil Company, New York, N.Y., a corporation of Delaware
Filed Sept. 28, 1964, Ser. No. 399,926
Claims priority, application Netherlands, Sept. 30, 1963, 298,567
6 Claims. (Cl. 208—325)

This invention relates to an improved process for the separation of mixtures by means of a selective solvent. More particularly, the separation employs selective solvents having a relatively high polarity and solubility for certain compounds when compared to these properties with respect to other compounds of the mixture.

The desirability of separating mixtures of organic compounds is of frequent occurrence, both in the chemical and the pharmaceutical as well as the mineral oil industry. For this reason, many selective solvents have already been suggested. However, few of these solvents have found been practical application as most solvents lack one or more properties required for technical application. A selective solvent suitable for wide application should in the first place have a high solvent power (high polarity), a low light-heavy selectivity and a satisfactory group selectivity. In addition, depending on the separation concerned, the solvent should as a rule meet the following requirements: a boiling point or another physical property permitting a ready recovery of the solvent, a sufficient density difference with respect to the raffinate stage, a low viscosity, chemical inertness (both with respect to the mixture to be separated and the apparatus), sufficient thermal stability, little volatility, and moderate price.

It is the primary object of this invention to provide an improved process for the separation of mixtures of organic compounds by means of a selective solvent. A further object of this invention is to effect the separation by contacting the mixture with at least one heterocyclic 5-membered ring compound having a pentavalent phosphorus atom and four carbon atoms in the ring. An additional object is to employ a selective solvent wherein the heterocyclic 5-membered ring compound has in addition to a pentavalent phosphorus atom and four carbon atoms in the ring, an oxygen or sulfur atom linked to the phosphorus atom by a double bond. A still further object is to employ heterocyclic 5-membered ring compounds with substituted or unsubstituted alkyl, alkaryl, aralkyl and/or aryl groups attached to the carbon atoms and/or phosphorus atom directly or via an oxygen, sulfur or nitrogen atom. It is an additoinal object of this invention to employ the selective solvents in conjunction with "chemical solvents." These objects will be better understood and others will become apparent from the description of the invention which will be made with reference to the accompanying drawing wherein:

FIGURES A, B and C are graphs depicting the distribution coefficients for three heterocyclic 5-membered ring compounds of this invention.

Now, in accordance with this invention, the heterocyclic compounds which form the desired class of selective solvents include those having the schematic formula:

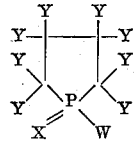

wherein X is an atom selected from the group consisting of oxygen and sulfur, and each Y and W are each selected from the group consisting of hydrogen and substituted and unsubstituted alkyl, aralkyl, alkaryl and aryl groups of up to 10 carbon atoms with the proviso that two Y's, on adjacent carbon atoms together can represent a double bond, with the further proviso that each Y and W can be attached to a ring member through an atom selected from the group consisting of oxygen, sulfur and nitrogen. The compounds of this invention are the phosphacyclopentane and phosphacyclopentene derivatives wherein the carbon-carbon bond in the ring can include up to one double bond, and which are more commonly referred to as phospholidines (phospholanes) and phospholines, respectively.

While the present invention does not depend on any postulated theory, it is believed that compounds of the instant invention derive their value as a class of selective solvents from the strongly polar phosphorus-oxygen or phosphorus-sulfur combination in the carbon-containing ring. An additional important feature of this type of compound is that it is possible to modify the properties by the introduction of substituents into the cyclic portion, both at the remaining valence of the phosphorus atom and at one or more of the carbon atoms. By introducing suitable polar or non-polar substituents the physical properties, e.g., the boiling point, the selectivity and the solvency towards the compounds to be separated, as well as the chemical properties, such as the thermal and the oxidation stability, can be varied within wide limits. In this way a selective solvent can therefore be obtained with optimal properties for a certain separation.

An advantageous starting material for the preparation of the present selective solvents is 1,1,1-trihalophospholine of the formula:

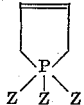

where Z represents halogen and preferably chlorine or bromine. The 1,1,1-trihalophospholine can be simply obtained by reaction of a phosphorus halide with a diene according to the process described in co-pending United States patent application Ser. No. 274,386, filed Apr. 18, 1963. Suitable dienes are: 1,3-butadiene, isoprene, chloroprene, 2,3-dimethylbutadiene, 1,1,3-trimethyl-1,3-butadiene, 1-phenyl-1,3-butadiene, 1-acetoxy-1,3-butadiene, 2,3-diphenyl-1,3-butadiene, 1,1'-biscyclohexenyl. Preferable starting materials include 1,3-butadiene, isoprene, 2,3-dimethyl-1,3-butadiene and 1,1'-biscyclohexenyl; phosphorus trichloride.

The trihalophospholines can be converted by means of, e.g., a hydroxy compound, such as water or an alcohol, into 1-oxophospholines, while by reaction with, e.g., sulfides or mercaptans, the thiophospholines can be obtained. 1-oxo-1-alkoxy or 1-aroxyphospholines can, e.g., be prepared by reacting trihalophospholines with aliphatic alcohols and phenols, respectively, preferably in the presence of amines. The corresponding phospholidines can be obtained by hydrogenation of the oxo and thiophospholines, respectively.

Preferred selective solvents are the heterocyclic 5-membered ring compounds with substituted or unsubstituted alkyl, alkaryl, aralkyl and/or aryl groups as substituents at the remaining valency of the phosphorus atom and/or at one or more of the carbon atoms in the ring. These groups may be bound either directly or via an oxygen, sulfur or nitrogen atom. The aforementioned groups may, e.g., be substituted by hydroxyl groups or by halogen atoms.

Substituents at the remaining valency of the phosphorus atom and the carbon atoms in ring, may include an alkyl radical of 1–10 carbon atoms and preferably about 3–6, or an aryl radical with 6–10 carbon atoms, preferably about 7–8, which may be bound either directly or via an oxygen, sulfur or nitrogen atom.

Examples of solvents with very good selective properties are: 1-oxo-1-methyl, 1-oxo-1-ethyl, 1-oxo-1-propyl, 1-oxo-1-butyl, 1-oxo-1-phenylphospholine, the corresponding thio compounds, as well as the corresponding phospholidines and mixtures thereof. Further examples of selective solvents with a somewhat polar character include: 1-oxo-1-methoxy, 1-oxo-1-ethoxy, 1-oxo-1-propoxy, 1-oxo-1-butoxy, 1-oxo-1-phenoxyphospholine, the corresponding thio compounds, as well as the corresponding phospholidines or mixtures thereof. Also suitable are the 1-oxo-1-N,N-dialkylamino, and 1-thio-1-N,N-dialkyl-aminophospholines as well as the corresponding phospholidines and mixtures thereof.

The influence on the polar properties of oxo and thio compounds is particularly effected by the possibility of binding polar or non-polar groups to the remaining valency of the phosphorus atom. It has been observed that that influence of a polar group bound to the phosphorus atom is considerably greater than if the same group is attached to one of the carbon atoms in the ring. Best results are obtained where the polar substituents have short alkyl radicals, e.g., 1–4 carbon atoms. Where the polarity of these compounds is too high for a certain application, use can be made of compounds with a somewhat longer hydrocarbon radical, attached to an oxygen, sulfur or nitrogen atom, or of compounds with a hydrocarbon radical at more than one carbon atom of the ring. As examples of these compounds may be mentioned 1-oxo-1-methoxy-3-methyl, 1-oxo-1-ethoxy-3-methyl, 1-oxo-1-propoxy-3-methyl, 1-oxo-1-butoxy-3-methyl, 1-oxo-1-ethoxy-3-ethyl, 1-oxo-1-ethoxy-3,4-dimethylphospholine, the corresponding thio compounds, as well as the corresponding phospholidines and mixtures thereof.

The selective solvents according to the invention possess relatively high boiling points and are comparable with the well known extractants such as diethylene glycol and sulfolane. Preferably heterocyclic phosphorus compounds boiling between 250 and 400° C. are applied.

The solvency, light-heavy selectivity and group selectivity have been determined for two of the present selective solvent heterocyclic phosphorus compounds, i.e., 1-oxo-1-methoxyphospholine-2 and 1-oxo-1-ethoxyphospholine-2; see Table I. In addition, comparative experiments were performed with sulfolane, a very good technical selective solvent.

The solvent properties of these compounds were derived from the distribution behavior of paraffins, aromatics and naphthenes, respectively, in systems consisting of one of the phospholines and n-decane as a counter solvent at 50° C.

Distribution coefficients ($k$) were measured at various concentrations for the above-mentioned hydrocarbons. From the results obtained the distribution coefficients at infinite delution ($k°$) were derived by extrapolation.

The value of $k$ has been defined as:

$$k = \frac{\text{percent } w \text{ of component in decane phase}}{\text{percent } w \text{ of component in polar solvent phase}}$$

TABLE I.—DISTRIBUTION COEFFICIENTS AT FINITE AND INFINITE DILUTION AT 50° C.

| Component | Percent by weight in decane phase | $k$ | Percent by weight in decane phase | $k$ | Percent by weight in decane phase | $k$ | Percent by weight in decane phase | $k°$ (by extrapolation) |
|---|---|---|---|---|---|---|---|---|
| System: 1-oxo-1-ethoxyphospholine-2/n-decane: | | | | | | | | |
| n-Hexane | 6.92 | 7.3 | 5.69 | 8.6 | 3.12 | 11.2 | <0.01 | 12.5 |
| n-Octane | 8.08 | 10.4 | 6.72 | 12.4 | 3.80 | 16.5 | <0.01 | 20 |
| Benzene | 5.75 | 1.1 | 4.41 | 1.1 | 2.99 | 1.1 | <0.01 | 1.1 |
| Ethylbenzene | 6.85 | 1.7 | 5.43 | 1.75 | 2.94 | 1.8 | <0.01 | 1.8 |
| MCH* | 8.13 | 6.1 | 6.76 | 7.1 | 3.76 | 9.4 | <0.01 | 10 |
| System: 1-oxo-1-methoxyphospholine-2/n-decane: | | | | | | | | |
| n-Hexane | 6.32 | 23.6 | 3.12 | 28.6 | 1.16 | 32.2 | <0.01 | 35 |
| n-Octane | 7.35 | 48.7 | 3.67 | 60.2 | 1.41 | 61.1 | <0.01 | 71 |
| Benzene | 5.07 | 1.5 | 2.28 | 1.5 | 0.83 | 1.55 | <0.01 | 1.58 |
| Ethylbenzene | 6.51 | 3.0 | 3.07 | 3.1 | 1.16 | 3.2 | <0.01 | 3.2 |
| MCH* | 7.52 | 19.3 | 3.75 | 22.8 | 1.45 | 25.4 | <0.01 | 27.5 |
| System: sulfolane/n-decane: | | | | | | | | |
| n-Hexane | 6.06 | 38 | 3.31 | 44 | 1.13 | 47 | <0.01 | 49 |
| n-Octane | 7.10 | 74 | 3.83 | 83 | 1.30 | 93 | <0.01 | 98 |
| Benzene | 4.98 | 1.7 | 2.52 | 1.7 | 0.80 | 1.7 | <0.01 | 1.7 |
| Ethylbenzene | 6.45 | 3.4 | 3.31 | 3.5 | 1.06 | 3.4 | <0.01 | 3.4 |
| MCH* | 7.34 | 28 | 3.98 | 32 | 1.41 | 37 | <0.01 | 40 |

*Methylcyclohexane.

FIGURES A, B and C show along the vertical axis the distribution coefficients at 50° C. and at infinite dilution ($k°$) and along the horizontal axis the number of carbon atoms ($n$) of the paraffins, naphthenes and aromatics. FIG. A represents the system n-decane/1-oxo-1-ethoxyphospholine-2, FIG. B the system n-decane-1-oxo-1-methoxyphospholine-2 and FIG. C the system n-decane/sulfolane.

From the data obtained a number of factors that are important for the appreciation of an extraction solvent can be derived, e.g., the group selectivity, the light-heavy selectivity and the solvent capacity.

The group selectivity, which is important for the separation of homologous series of compounds, is indicated by the ratio of the distribution coefficients of individual compounds having an equal number of carbon atoms, from each of the series. This ratio is directly correlated with the number of extraction stages required for a given separation. For the separation of paraffinic and aromatic compounds this ratio ($k_p/k_a$, see Table II) is of the same order for methoxyphospholine and sulfolane. The group selectivity of ethoxyphospholine, however, is lower, so that for a given separation the number of stages will be somewhat higher if this polar solvent should be utilized.

TABLE II.—CONSTANTS FOR CALCULATION OF DISTRIBUTION COEFFICIENTS
[n-Decane as counter solvent]

| Type of hydrocarbons | 1-oxo-1-ethoxy-phospholine-2 | | 1-oxo-1-methoxy-phospholine-2 | | Sulfolane | |
|---|---|---|---|---|---|---|
| | a | b | a | b | a | b |
| Paraffins | 0.485 | 0.102 | 0.623 | 0.154 | 0.787 | 0.151 |
| Aromatics | −0.569 | 0.102 | −0.723 | 0.154 | −0.673 | 0.151 |
| Naphthenes | 0.286 | 0.102 | 0.361 | 0.154 | 0.545 | 0.151 |
| ($k_p/k_a$) | about 11 | | about 22 | | about 28 | |

The light-heavy selectivity is shown by the variation of the distribution coefficients ($k$) with molecular weight for the members of a given homologous series of compounds. From the literature it is known that this variation may be expressed by the equation:

$$\log k = a + b.n$$

in which $n$ stands for the number of C atoms and $a$ and $b$ are constants. The lower the value of $b$, the more favorable the separation in fractions of different types of compounds. From Table II it can be seen that in this respect, methoxyphospholine and sulfolane are on a par. This type of selectivity is somewhat favorable for ethoxyphospholine, permitting wide-boiling-range fractions to be extracted.

The capacity of a polar solvent can further be related to the absolute values of $k$ (Table I). As this value is lower, the solubility in the polar solvent will be higher. Hence, the $k$ values are an indication of comparison of the required solvent ratios. In this respect, too, methoxyphospholine and sulfolane are therefore of the same order. The capacity of ethoxyphospholine is even higher.

The above experimental results illustrate the similarity between methoxyphospholine and sulfolane in solvent properties. Most other phospholine and phospholidine derivatives which may be obtained by the introduction of various substituents, have as a rule a higher solvent power and a somewhat lower selectivity than sulfolane. They will therefore offer advantages in all those cases where a solvent power higher than that of sulfolane is desirable, e.g., the extraction of aromatic compounds from higher-boiling hydrocarbon oil fractions such as kerosene and the extraction of olefins from low-boiling hydrocarbon mixtures such as $C_3$–$C_5$ fractions.

An important advantage of the present selective solvents is that they have excellent thermal stability, as a result of which, e.g., in working up the solvent from an extract phase or during extractive distillations, little if any decomposition occurs. An additional advantage is their good resistance to hydrolysis. Increased resistance to hydrolysis may, if desired, be achieved by the introduction of suitable substituents at the remaining valency of the phosphorus atom. In this connection, 1-alkyl and 1-aryl derivatives, as well as ester groups which are known to possess good resistance to hydrolysis, such as halogen-substituted alkoxy groups.

Introduction of substituents into the heterocyclic phosphorus compounds of this invention renders it possible to simply obtain very high-boiling selective solvents. This may be important in extracting higher-boiling, e.g., 250° C. to 450° C., hydrocarbon fractions, such as kerosine.

Suitable starting materials to be separated according to the invention are mixtures of organic compounds with at least one component which is more polar than the other components of the mixture. Phenols, cresols and thiophenes, which contain OH or SH as polar groups, can be separated from hydrocarbons, such as benzene. Likewise, mercaptans and alkyl sulfide can be removed from hydrocarbon oil fractions. In case the mixture to be separated consists exclusively of hydrocarbons of different structure, the decreasing solubility of the present selective solvents in general permits a separation in the following succession of classes of compounds: aromatics, cycloolefins, naphthenes, olefins, aliphatic hydrocarbons.

The selective solvents according to the invention are suitable both for liquid-liquid extractions and for extractive distillations and absoption of gases.

Important applications of extractions are in the field of the mineral oil industry, e.g., the separation and recovery of aromatic compounds from hydrocarbon oil distillates. An advantage of the invention is in the preparation of extracts with an increased content of aromatic hydrocarbons, to be applied as such, or after distillation, as motor fuel component. The present solvents may also be used, however, to obtain pure or substantially pure aromatic hydrocarbons, such as benzene, toluene and/or xylenes, by extraction of hydrocarbon oil fractions for use in the chemical industry.

Suitable hydrocarbon mixtures include hydrocarbon fractions, such as naphthas obtained by direct distillation, by catalytic cracking or by catalytic reforming. Owing to their relatively high content of aromatic compounds the last-mentioned fractions in particular are a valuable source of benzene, toluene and xylenes.

The extractions are preferably carried out in a multi-stage countercurrent system, e.g., a packed column or a column provided with perforated plates. For example, a column wherein a shaft with discs is rotatably mounted could be used; see U.S. 2,729,545.

In extracting hydrocarbon oil fractions the ratio by weight between the selective solvent and the product to be extracted is in general chosen between 1:2 and 10:1 and preferably between 1.5:1 and 4:1.

Extraction and recovery of light aromatic hydrocarbons in a pure or substantially pure form with the present selective solvents is preferably performed as follows:

A hydrocarbon oil fraction containing benzene, toluene, xylenes and/or ethylbenzene is passed into one side of a multi-stage countercurrent extraction system, where a temperature of lower than 150° C. prevails and a pressure is maintained which is at least sufficient to keep the various flows in the liquid state. On the other side of the extraction system the heterocyclic phosphorus compound(s) is (are) introduced in a quantity of 1.5–4 parts by weight per part by weight of the product to be extracted, and on the same side of the system the raffinate, with only a low content of aromatic hydrocarbons, is discharged. On the side of the extraction system into which the starting material is fed, an aromatic-rich extract phase is passed, preferably without cooling, into a stripping column with at least 3 theoretical plates. The stripping column has a bottom temperature of between 140 and 160° C. and a pressure is maintained lower than in the extraction system, preferably between 1 and 2 atmospheres absolute. The vapor-phase material developed in the stripping column is condensed, and after separation of any water phase formed, recycled to the extraction system and fed at a point near the outlet of the extract phase, preferably between the first and the second theoretrical plate. The extract phase draining away at the bottom of the stripping column is passed into a distillation column, where a pressure is maintained lower than that in the stripping column, preferably between 0.3 and 0.5 atmospheres absolute and a bottom temperature of lower than 200° C., preferably between 150° C. and 180° C., the selective solvent draining away at the bottom of this column being cooled and then recycled to the extraction system. The aromatic compound(s) obtained over the top of the distilling column is (are), if so desired, further worked up in one or more fractionating columns.

The extraction may, if so desired, be performed under even more favorable conditions by also using a counter solvent. This counter solvent may be passed into the system at a point near the outlet of the extract phase either together with the material discharged as top product from the stripping column or separately. Counter solvents include paraffinic hydrocarbons or hydrocarbon mixtures containing paraffinic hydrocarbons, such as platformate fractions and/or straight run naphthas having a boiling range between 100° C. and 180° C. The latter mixtures should contain at least 30% by volume of paraffinic hydrocarbons. When such a counter solvent is used a smaller quantity of the material to be recycled from the stripping column to the extraction system will suffice or the stripping column can be omitted altogether. The quantity of counter solvent required is dependent, among other things, on its composition, in particular on its content of aromatics.

To effect an easy separation between the counter solvent used and the raffinate or, respectively, extract, one may choose a counter solvent with a lower or, respectively, higher boiling point or with lower or, respectively, higher boiling ranges, then the raffinate or extract. The product streams can then be separated by distillation, the counter solvent being recycled to the process. Preferably the boiling point or, respectively, the boiling ranges are chosen such that a simple distillation will suffice. An example of a lower-boiling counter solvent is pentane, while a higher-boiling counter solvent could be a paraffinic hydrocarbon oil fraction boiling above 200° C. The counter solvent need not always be removed where in refinery operation, the draining raffinate phase as such is suitable for a practical application.

Extractive distillation can be used to recover aromatic compounds from hydrocarbon oil fractions containing a relatively high content of aromatics, e.g., the liquid product that can be separated from coke oven gases.

The selective solvent is then fed in near the top of a distilling column and passed counter-current with the mixture to be separated, into the column in vapor phase, e.g., about half-way between top and bottom. The descending solvent absorbs the better-soluble components, e.g., the aromatics, from the starting material and as a result the relative volatility of the less soluble components increases with respect to that of the better-soluble ones.

The extract phase, which can be worked up in the usual way, drains away at the bottom, the raffinate phase being discharged at the top of the column. If desired, part of the raffinate phase can be condensed and then recycled to the column at a spot near the top.

It should be observed that, owing to the highly selective properties of the present solvents, as well as to the very low volatility of many of these solvents, the raffinate phase discharged over the top contains only a relatively small percentage of solvent. The solvent present in the raffinate phase can be easily separated from it, by washing with water; when the water has been stripped off, the solvent can be recycled to the process. In the extractive distillations the quantity of solvent used is advantageously 0.5-20 parts by volume and preferably not more than 5 parts by volume per part by volume of mixture to be separated.

An example of a selective absorption is the separation of diolefins from gaseous hydrocarbon mixtures which also contain olefins and saturated hydrocarbons. Of practical importance is, e.g., the separation of butadiene from butadiene-containing gas mixtures. Separation of such mixtures by distillation is unsuitable because of the small difference between the boiling points of these components. By means of the selective solvents according to the invention a considerable increase in concentration of butadiene may already be obtained in a simple way, e.g., by four-stage countercurrent absorption. A complete separation can be achieved by increasing the number of theoretical plates.

In cases where it is desirable in extractions, extractive distillations or absorptions to increase the selectivity of the present solvents an antisolvent, e.g., water, may be used. The quantity of water generally used is less than 10% by weight and preferably less than 5% by weight, calculated on solvent.

The separation of acidic components, such as hydrogen sulfide, carbonyl sulfide, sulfur dioxide and carbonic acid, from gas mixtures such as natural or synthesis, refinery or flue gases, with "chemical" solvents, such as aqueous solutions of alkanolamines, is known. Solvents of this type, however, have certain drawbacks. One is that they have a relatively low solubility for the gaseous acid components. This is particularly a drawback when the acid gases have a relatively high partial pressure, because then only part of the acid components is removed.

The above objections are eliminated if the acid components are absorbed with a mixture of one or more of these "chemical" solvents and of one or more of the present selective solvents. Such a mixture incorporates the advantages both of the "chemical" and of the "physical" absorbents. One of the consequences is that removal of acid gases is possible over a wide range of partial pressures.

As "chemical" solvents, amines are generally suitable. Preferably, however, alkanolamines with 1–4 carbon atoms and especially with 2–3 carbon atoms per alkanol group are applied. Examples of these are monoethanolamine, diethanolamine, dimethanolamine, di-n-propanolamine, diisopropanolamine, the dibutanolamines and mixtures thereof.

In particular dipropanolamines are advantageous because of their relatively large absorption capacity for acid compounds. These amines are obtained as technical mixtures in the preparation of diethanolamine and preferably contain more than 90% by weight of diisopropanolamine with mono and tripropanolamines as the remaining components.

When a mixture of amines and heterocyclic phosphorus compounds is used, it is in general advantageous to carry out the absorption in the presence of water, for example, in a quantity of 1–25% by weight calculated on the mixture. This measure leads to lower stripping temperatures, as a result of which any tendency toward decomposition of the absorbent is counteracted.

The removal and recovery of acid compounds from these gas-containing mixtures is carried out by contacting the gas mixture, preferably at a temperature of 20–125° C. and at increased pressure, for example 5–50 atmospheres absolute, with a liquid absorbent containing 5–70% by weight of amines and 30–95% by weight of the present heterocyclic phosphorus compounds. The absorption is promoted by an intimate contact between the phases and can be performed in a vertically placed absorption column. The gas to be treated is fed near the bottom of the column, while the fresh absorption liquid is introduced near the top of the column. At the top of the column the gas freed from acid components is discharged, while the charged absorbent drains away at the bottom. The absorbed components can be removed from the charged absorbent by passing the latter into a stripping column at a point about half-way between top and bottom, where at increased temperature and at reduced pressure the acid compounds are desorbed and discharged over the top, while the absorbent to be regenerated is recycled to the process.

Another advantage is obtained by carrying out the absorption of the acid compounds under rectifying conditions, the bottom of the absorption column being heated with, e.g., a steam coil.

Although the advantages of a mixed solvent for the absorption of acid gases have been elucidated above, it is further pointed out that the heterocyclic phosphorus compounds can obviously also be used as such, i.e., without amines, as absorption liquid for acid gases.

The following specific examples of the invention will serve to more clearly illustrate the application of the invention, but the details thereof are not to be construed as limiting the invention.

*Example 1*

A mixture of 7 parts by weight of toluene and 57 parts by weight of n-heptane was subjected at 50° C. to a 1-stage liquid-liquid separation by means of 100 parts by weight of 1-oxo-1-ethoxyphospholine as selective solvent. After the phases had been contacted in a propeller mixer for 10 minutes, layer separation revealed that the raffinate phase contained 1.7 parts by weight of toluene and 32.3 parts by weight of n-heptane, while the extract phase consisted of 5.3 parts by weight of toluene, 24.7 parts by weight of n-heptane and 100 parts by weight of solvent. The toluene concentrations in the starting material, the raffinate and the extract were 11, 5 and 18% by weight, respectively.

Example II

To obtain pure aromatics, e.g., benzene, toluene and xylenes, a platformate fraction with boiling ranges between 70 and 145° C., the composition of which was shown in Table III, column 1, was extracted.

The extraction of platformate was carried out at a temperature of 60° C. and a pressure of 2 atmospheres absolute in an extraction column with 10 theoretical plates with 1-oxo-1-methoxyphospholine as selective solvent. The feed was charged continuously at a point corresponding with 2 theoretical plates calculated from the bottom of the column. Near the top the selective solvent was fed, also continuously, in a quantity of 260 parts by weight per 100 parts by weight of feed.

At the top of the column the raffinate, with a composition as listed in Table III, column 3, was discharged. The extract phase draining away at the bottom of the column was fed near the top of a stripping column with 6 theoretical plates to remove the non-aromatic hydrocarbons present in this phase. These hydrocarbons, together with part of the aromatic compounds, were discharged over the top, and, after condensation, recycled near the bottom of the extraction column. In the stripping column a pressure of 1 atm. abs., a top temperature of 80° C. and a bottom temperature of 160° C. was maintained. The composition of the recycled mixture is shown in Table III, column 5. The extract phase discharged at the bottom of the stripping column was passed into a distilling column with 8 theoretical plates at a point about half-way between top and bottom of the column. In this column a pressure of 0.2 atmospheres absolute, a top temperature of 60° C. and a bottom temperature of 170° C. were maintained. To remove remnants of aromatic compounds from the solvent, steam was fed at the bottom of the distilling column in a quantity of 5% by weight on starting material. The solvent draining away at the bottom was cooled and then recycled to the extraction column. The aromatic extract was recovered over the top of the column; its composition is listed in Table III, column 4. Small quantities of solvent present in the raffinate phase can be recovered by washing with water and then recycled to the process.

TABLE III

| | 1 Feed | 2 Solvent | 3 Raffinate | 4 Extract | 5 Recycle | 6 Stripping steam |
|---|---|---|---|---|---|---|
| Parts by weight: | | | | | | |
| Benzene | 5 | | | 5 | 5 | |
| Toluene | 25 | | 0.3 | 24.7 | 8 | |
| Xylenes and ethylbenzene | 15 | | 1.0 | 14 | 2 | |
| Non-aromatics | 55 | | 55 | 0.01 | 15 | |
| Solvent | | 260 | | | | |
| Water | | | | | | 5 |

Example III

To purify a benzene fraction separated from a hydrogenated coal tar fraction a continuous extractive distillation was performed with 1-oxo-1-methoxyphospholine as selective solvent. For this purpose the benzene fraction, whose composition is given in Table IV, column 1, was charged half-way between top and bottom of the distilling column (in total 10 theoretical plates). Near the top of the column the selective solvent was introduced in a quantity of 350 parts by weight per 100 parts by weight of benzene fraction. In the column a pressure of 1 atmosphere absolute, a bottom temperature of 145° C. and a top temperature of 80° C. were maintained.

The raffinate discharged at the top of the column contained only minor quantities of phospholine, the composition of which is given in Table IV, column 3.

By using a reflux of raffinate phase at the top of the column a raffinate can be obtained that is free of phospholine.

The extract phase draining away at the bottom of the column was fed into a stripping column with 8 theoretical plates at a point half-way between top and bottom. In the column a pressure of 1 atmosphere absolute, a bottom temperature of 180° C. and a top temperature of 82° C. were maintained, steam being fed in near the bottom in a quantity of 7% by weight on starting material. The solvent draining away at the bottom was cooled and then recycled to the extraction column. The composition of the extract obtained over the top is given in Table IV, column 4.

TABLE IV

| | 1 Feed | 2 Solvent | 3 Raffinate | 4 Extract | 5 Stripping steam |
|---|---|---|---|---|---|
| Parts by weight: | | | | | |
| Benzene | 75 | | 1 | 74 | |
| Toluene | 15 | | | 15 | |
| Cyclohexane | 3 | | 3 | 0.02 | |
| Methylcyclopentane | 2 | | 2 | 0.01 | |
| C7-naphthenes | 2 | | 2 | 0.11 | |
| Paraffins | 3 | | 3 | | |
| Solvent | | 350 | | | |
| Water | | | | | 7 |

Example IV

To prepare a gasoline with a low aromatic content (white spirit) a straight-run fraction with a boiling range of 152–206° C. (ASTM) with a content of 18% by weight of aromatics and 82% by weight of non-aromatics, was extracted. After desulfurization this fraction was extracted at a temperature of 130° C. and a pressure of 1.5 atmospheres absolute in an extraction column with 10 theoretical plates with 1-oxo-1-phenoxyphospholine as selective solvent.

The feed was charged continuously near the bottom of the column; the extractant was, also continuously, fed near the top in a quantity of 320 parts by weight per 100 parts by weight of feed. At the top of the column raffinate was discharged with a composition as given in Table V, column 3. The composition of the aromatics-poor gasoline thus obtained corresponds with a content of 98% by weight of non-aromatics and 2% by weight of aromatics. The extract phase discharged at the bottom of the extraction column was passed into a distilling column with 10 theoretical trays at a point half-way between top and bottom of the column. In this column a pressure of 0.05 atmospheres, a bottom temperature of 200° C. and a top temperature of 80° C. were maintained. The solvent draining away at the bottom was cooled and then recycled to the extraction column. The extract, whose composition is given in Table V, column 4, was recovered over the top of the distilling column. This composition corresponds with a content of 56% by weight of aromatics and 44% by weight of non-aromatics.

TABLE V

| | 1 | 2 | 3 | 4 |
|---|---|---|---|---|
| | Feed | Solvent | Raffinate, percent by weight | Extract, percent by weight |
| Parts by weight: | | | | |
| Aromatics | 18 | | 1.5 (2) | 16.5 (56) |
| Non-aromatics | 82 | | 69 (98) | 13 (44) |
| Solvent | | 320 | | |

Example V

In a counter-current extraction apparatus with 4 theoretical plates a mixture of 4.06 parts by weight of n-hexane and 6.94 parts by weight of cyclohexane was extracted on a laboratory scale at 40° C. with 160 parts by weight of 1-oxo-1-methoxyphospholine as selective solvent.

The compositions of the raffinate and the extract are given in Table VI, columns 3 and 4, respectively. The concentrations of cyclohexane in the feed, the raffinate and the extract were 63, 39 and 74% by weight, respectively.

TABLE VI

| | 1 | 2 | 3 | 4 |
|---|---|---|---|---|
| | Feed | Solvent | Raffinate | Extract |
| Parts by weight: | | | | |
| Cyclohexane | 6.94 | | 1.34 | 5.60 |
| n-Hexane | 4.06 | | 2.12 | 1.94 |
| Solvent | | 160 | 0.12 | 160 |
| Conc., percent by weight, of cyclohexane, solvent-free | 63 | | 39 | 74 |

Example VI

To remove benzene from a paraffinic $C_6$ fraction, the composition of which is included in Table VII, column 1, a continuous extraction was performed with 1-oxo-1-ethoxyphospholine. The feed was charged continuously near the bottom of an extraction column with 8 theoretical plates; the extractant was also introduced continuously near the top of the column in a quantity of 350 parts by weight per 100 parts by weight of feed; the temperature in the column was 65° C. and the pressure 1 atm. abs. At the top of the column raffinate was discharged with a composition as stated in Table VII, column 3. The extract phase discharged at the bottom of the extraction column was passed into a distilling column with 6 theoretical plates at a point half-way between top and bottom of the column. In this column a pressure of 1 atmosphere absolute, a bottom temperature of 170° C. and a top temperature of 78° C. were maintained, while near the bottom 5 parts by weight of steam calculated on starting material were introduced. The solvent draining away at the bottom was cooled and then recycled to the extraction column. The extract, whose composition is included in Table VII, column 4, was recovered over the top of the column.

TABLE VII

| | 1 | 2 | 3 | 4 | 5 |
|---|---|---|---|---|---|
| | Feed | Solvent | Raffinate | Extract | Stripping steam |
| Parts by weight: | | | | | |
| Benzene | 5 | | 0.05 | 5 | |
| $C_6$-naphthenes | 10 | | 7 | 3 | |
| $C_6$-paraffins | 85 | | 82 | 3 | |
| Solvent | | 350 | | | 5 |

Example VII

To increase the content of diolefins a $C_4$ fraction containing 10 parts by weight of $C_4$ olefins and 15 parts by weight of $C_4$ diolefins, was treated with 1-oxo-1-ethoxyphospholine as selective absorbent in a laboratory absorption column with about 4 theoretical plates.

For this purpose the $C_4$ fraction was fed continuously, in vapor form, near the bottom of the column; the selective absorbent was, also continuously, fed near the top in a quantity of 100 parts by weight per 25 parts by weight of feed. At the top the raffinate was discharged in vapor form; its composition is given in Table VIII, column 3. The extract phase draining away at the bottom of the column had a composition as shown in column 4. The concentrations of diolefins in the feed, the raffinate and the extract were 60, 30 and 68% by weight, respectively.

TABLE VIII

| | 1 | 2 | 3 | 4 |
|---|---|---|---|---|
| | Feed | Solvent | Raffinate | Extract |
| Parts by weight: | | | | |
| $C_4$-olefins | 10 | | 3.5 | 6.5 |
| $C_4$-diolefins | 15 | | 1.5 | 13.5 |
| Solvent | | 100 | | 100 |

Example VIII

To remove pentylmercaptan from n-heptane, the composition of which is included in Table IX, column 2, an extraction was performed with 1-oxo-1-methoxyphospholine at 30° C. For this purpose the feed was fed continuously near the bottom of an extraction apparatus consisting of a vertical column provided with a shaft with rotating discs, having a separating efficiency of 12 theoretical plates. The extractant was fed, also continuously, near the top of the column, in a quantity of 400 parts by weight per 100 parts of feed. At the top raffinate was discharged and at the bottom the mercaptan-containing extract phase. The compositions of the two phases are listed in Table IX, columns 3 and 4, respectively.

TABLE IX

| | 1 | 2 | 3 | 4 |
|---|---|---|---|---|
| | Solvent | Feed | Extract | Raffinate |
| Parts by weight: | | | | |
| Solvent | 400 | | ~400 | 0.3 |
| n-Heptane | | 98 | 4.3 | 93.7 |
| Pentylmercaptan | | 2 | ~2 | 0.025 |

We claim as our invention:

1. A process for selectively extracting aromatics from a hydrocarbon mixture of aromatics and non-aromatics which comprises the steps of:

(a) contacting said mixture with a selective solvent having the formula

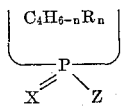

and mixtures thereof wherein R is hydrogen or lower alkyl, $n$ is an integer from 0 to 2, X is oxygen or sulfur and Z is selected from the group consisting of lower alkyl, lower alkoxy, phenyl, phenoxy and N,N-dialkylamino; whereby the aromatics are selectively extracted by the solvent to form an aromatic rich fat solvent extract phase and a non-aromatic hydrocarbon raffinate phase;

(b) separating the fat solvent phase from the non-aromatic hydrocarbon raffinate phase; and (c) separating the aromatics from the fat solvent.

2. A process in accordance with claim 1 wherein the selective solvent is selected from the group consisting of 1-oxo-1-methyl, 1-oxo-1-ethyl, 1-oxo-1-propyl, 1-oxo-1-butyl, 1-oxo-1-phenylphospholine, and mixtures thereof.

3. A process in accordance with claim 1 wherein the selective solvent is selected from the group consisting of 1-oxo-1-methoxy, 1-oxo-1-ethoxy, 1-oxo-1-propoxy, 1-oxo- 1-butoxy, 1-oxo-1-phenoxyphospholine, and mixtures thereof.

4. A process in accordance with claim 1 wherein the selective solvent is selected from the group consisting of 1 - oxo-1-N,N-dialkylamino, 1-thio-1-N,N-dialkylaminophospholine and mixtures thereof.

5. A process in accordance with claim 1 wherein the selective solvent is selected from a group consisting of 1-oxo-1-methoxy-3-methyl, 1-oxo-1-ethoxy-3-methyl, 1-oxo-1-propoxy-3-methyl, 1-oxo-1-butoxy-3-methyl, 1-oxo-1-ethoxy - 3-ethyl, 1-oxo-1-ethoxy-3,4-dimethylphospholine and mixtures thereof.

6. A process in accordance with claim 1 wherein the selective solvent contains from 1 to 10% by weight of water.

References Cited

UNITED STATES PATENTS

| 2,634,823 | 4/1953 | Drake et al. | 55—68 |
| 2,634,824 | 4/1953 | Drake et al. | 55—68 |
| 2,663,739 | 12/1953 | McCormack | 260—606.5 |

FOREIGN PATENTS 1,314,704  12/1962  France.

OTHER REFERENCES

Chem. Ber, 94, 1961, pp. 113 to 117.

DELBERT E. GANTZ, *Primary Examiner.*

H. LEVINE, *Assistant Examiner.*